United States Patent
Nishimura

(10) Patent No.: US 6,934,537 B2
(45) Date of Patent: Aug. 23, 2005

(54) RADIO COMMUNICATION DEVICE, METHOD OF AND PROGRAM FOR REWRITING BOOT PROGRAM THEREFOR

(75) Inventor: Yasunori Nishimura, Tokyo (JP)

(73) Assignee: NEC Corporation, Tokyo (JP)

( * ) Notice: Subject to any disclaimer, the term of this patent is extended or adjusted under 35 U.S.C. 154(b) by 566 days.

(21) Appl. No.: 10/198,131

(22) Filed: Jul. 19, 2002

(65) Prior Publication Data

US 2003/0027562 A1 Feb. 6, 2003

(30) Foreign Application Priority Data

Jul. 31, 2001 (JP) ........................................ 2001-231167

(51) Int. Cl.⁷ .............................................. G06F 9/445
(52) U.S. Cl. ...................... 455/418; 455/557; 711/103; 713/1; 713/2
(58) Field of Search .............................. 455/412.1, 418, 455/550.1, 556.1, 557; 711/101–103, 153, 173; 365/230.03; 713/1–2, 100

(56) References Cited

U.S. PATENT DOCUMENTS

| | | | | |
|---|---|---|---|---|
| 5,860,135 A | * | 1/1999 | Sugita | 711/173 |
| 5,987,605 A | * | 11/1999 | Hill et al. | 713/2 |
| 6,205,548 B1 | * | 3/2001 | Hasbun | 713/2 |
| 6,392,925 B2 | * | 5/2002 | Jha et al. | 365/185.04 |
| 6,745,278 B2 | * | 6/2004 | Oba | 711/103 |
| 6,751,727 B1 | * | 6/2004 | Cook et al. | 713/1 |

FOREIGN PATENT DOCUMENTS

| | | |
|---|---|---|
| EP | 0 524 719 | 1/1993 |
| JP | 3-189754 | 8/1991 |
| JP | 8-179937 | 7/1996 |
| JP | 2000-293376 | 10/2000 |

* cited by examiner

Primary Examiner—William Trost
Assistant Examiner—Brandon J. Miller
(74) Attorney, Agent, or Firm—Young & Thompson

(57) ABSTRACT

Information processors operate independently of each other. Memories are associated with the information processors, respectively, and connected to address and data lines of the information processors, for storing boot programs for the respective information processors. A selector assigns, in an address space as viewed from each of the information processors, the memory associated with another one of the information processors to an address represented by the sum of the address of the memory associated with the information processor and a predetermined offset, and outputs a resultant address produced by subtracting the offset from a specified address to the address and data lines of the other information processor when the memory associated with the other information processor is accessed.

30 Claims, 12 Drawing Sheets

US 6,934,537 B2

RADIO COMMUNICATION DEVICE, METHOD OF AND PROGRAM FOR REWRITING BOOT PROGRAM THEREFOR

BACKGROUND OF THE INVENTION

1. Field of the Invention

The present invention relates to a method of rewriting a boot program that is executed by a CPU to start a radio communication device such as a cellular phone unit or the like, and more particularly to a radio communication device and a method of rewriting a boot program which allow a rewritten boot program to be executed reliably.

2. Description of the Related Art

Cellular phone units that are available in recent years have additional functions including a mail function, a web function, a game function, etc. in addition to a conventional telephonic communication function, and need to perform complex software processing capabilities.

Some cellular phone units with such multiple functions have two CPUs, i.e., a CPU (hereinafter referred to as "communication core") for processing baseband signals with CODEC and performing a communication protocol control process between themselves and radio base stations, and a CPU (hereinafter referred to as "control core") for controlling displays, key operations, and other additional functions.

FIG. 1 of the accompanying drawings shows in block form a conventional cellular phone unit having two CPUs.

As shown in FIG. 1, conventional cellular phone unit 1300 has CPUs 1311, 1321, ROMs 1312, 1322, RAMs 1313, 1323, port interfaces 1314, 1324, and port switch 1301, and can be connected to personal computer (PC) 1310.

CPU 1311, ROM 1312, RAM 1313, and port interface 1314 are connected to each other by address and data lines 1315 of CPU 1311. CPU 1321, ROM 1322, RAM 1323, and port interface 1324 are connected to each other by address and data lines 1325 of CPU 1321.

CPU 1311 and CPU 1321 are processors that operate independently of each other, one serving as a communication core and the other a control core.

Programs that are executed by CPU 1311 is stored in ROM 1312. CPU 1311 temporarily uses RAM 1313 when it runs various programs.

Port interface 1314 controls port 1316 in order to allow communications between CPU 1311 and PC 1310.

Programs that are executed by CPU 1321 is stored in ROM 1322. CPU 1321 temporarily uses RAM 1323 when it runs various programs.

Port interface 1324 controls port 1326 in order to allow communications between CPU 1321 and PC 1310.

Port switch 1301 is instructed by PC 1310 to select either CPU 1311 or CPU 1321 and connect the selected CPU to PC 1310.

In devices incorporating a CPU therein, programs that are executed by the CPU are generally stored in a ROM. Recently, progresses in the electronic device technology make it possible to increase the storage capacity of devices capable of holding and rewriting recorded data without a power supply, such as a EEPROM (Electrically Erasable Programmable ROM) and an FROM (Flash ROM). Therefore, EEPROMs or FROMs are finding more applications than ordinary ROMs. ROMs 1312, 1322 shown in FIG. 1 comprise a ROM where recorded contents can be rewritten, such as an EEPROM or an FROM.

Generally, a program which is executed when a CPU is started is called a boot program. The boot program for CPU 1311 is stored in a particular area in ROM 1312, and the boot program for CPU 1321 is stored in a particular area in ROM 1322. When CPUs 1311, 1321 are started, they access the particular areas in ROMs 1312, 1322, respectively, and execute the boot programs stored therein.

If the boot program for CPU 1311 is to be changed due to a bug or an added or changed function, PC 1310 writes a new boot program into ROM 1312. Specifically, PC 1310 controls port switch 1301 to select port 1316, and transmits the new boot program to CPU 1311. CPU 1311 receives and writes the new boot program into the particular area in ROM 1312.

At this time, CPU 1311 may be running a program for usual operation (referred to as "on-line mode") or may be running a program for communicating with PC 1310 while stopping usual operation (referred to as "off-line mode"). In order for CPU 1311 to receive the boot program from PC 1310 in the on-line mode, the program for usual operation needs to have a process for communicating with PC 1310. In order for CPU 1311 to receive the boot program from PC 1310 in the off-line mode, an off-line program having a process for communicating with PC 1310 needs to be stored in ROM 1312 in a manner to be executable by CPU 1311.

Alternatively, conventional cellular phone unit 1300 may be arranged to write the boot program from PC 1310 directly into ROM 1312, not through CPU 1311. In this case, port interface 1314 acts as a bus master for address and data lines 1315.

When CPU 1311 is to be restarted after the boot program has been rewritten, CPU 1311 reads and executes the new boot program, and is started, confirming that the boot program has properly been changed.

The boot program for CPU 1321 may also be changed in the same manner as with the boot program for CPU 1311.

Japanese laid-open patent publications Nos. 8-179937 and 2000-293376 disclose boot program rewriting devices having a plurality of boot program areas which can easily be changed without complex operations.

FIG. 2 of the accompanying drawings shows in block form a conventional boot program rewriting device disclosed in Japanese laid-open patent publication No. 8-179937. The conventional boot program rewriting device shown in FIG. 2 has CPU 1401, resetting unit 1402, address decoder 1403, ROMs 1404a through 1404d, normal boot monitor unit 1405, reset switch 1406, and display LED 1407. It is assumed that the addresses of ROMs 1404a through 1404d are mapped in the order of ROM 1404a, ROM 1404b, ROM 1404c, and ROM 1404d.

CPU 1401 is started by boot programs stored in ROMs 1404a through 1404d. Addresses of the boot programs are input to ROMs 1404a through 1404d by low-order bits of address signal 1408.

Address decoder 1403 decodes high-order bits of address signal 1408 and generates chip select signals 1412a through 1412d. When accessed by CPU 1401, either one of ROMs 1404a through 1404d is selected by chip select signals 1412a through 1412d.

Resetting unit 1402 monitors a power supply voltage and reset switch 1406. When the power supply voltage drops or reset switch 1406 is operated, resetting unit 1402 generates a reset pulse of given duration. The reset pulse acts as CPU resetting signal 1409 and also as address decoder resetting signals 1410, 1411 for controlling the chip selection of address decoder 1403. Address decoder resetting signal 1410 is a resetting signal generated based on the monitoring of the power supply voltage. Address decoder resetting signal 1411 is a resetting signal generated when reset switch 1406 is operated.

When CPU 1401 is to be started based on the normal monitoring of the power supply voltage such as when the power supply is turned on, resetting unit 1402 generates CPU resetting signal 1409 and address decoder resetting signal 1410. ROM 1404a is selected, and CPU 1401 executes the boot program stored in ROM 1404a.

When reset switch 1406 is operated, on the other hand, resetting unit 1402 generates CPU resetting signal 1409 and address decoder resetting signal 1411. CPU 1401 is started in the same manner as when the power supply is turned on. Address decoder 1403 converts addresses generated by CPU 1401, and generates chip select signal 1412b for ROM 1404b which is mapped next to the ordinary boot ROM 1404a. CPU 1401 is then started by the boot program stored in ROM 1404b. Thereafter, each time reset switch 1406 is operated to generate address decoder resetting signal 1411, address decoder 1403 successively changes over chip select signals 1412a through 1412d for the boot addresses.

With the conventional arrangement shown in FIG. 2, as described above, each time reset switch 1406 is operated, one of four ROMs 1404a through 1404d is selected, and the boot program stored therein is used to start CPU 1401.

FIG. 3 of the accompanying drawings shows in block form a conventional boot program rewriting device disclosed in Japanese laid-open patent publication No. 2000-293376. The conventional boot program rewriting device shown in FIG. 3 has CPU 1501, selector 1502, and boot ROMs 1503, 1504. Selector 1502 has switching selector 1508 and offset register 1509. Two boot ROMs 1503, 1504 which are connected to address and data lines 1505 of CPU 1501 have respective storage capacities that are equal to each other.

For starting CPU 1501, selector 1502 decodes an address signal and selects boot ROM 1503 or boot ROM 1504. Boot ROMs 1503, 1504 store respective boot programs each including a check sum and a time stamp. These boot programs include a program of comparing the time stamps of programs written in boot ROMs 1503, 1504. The boot programs also include a process which enables the time stamp to determine whether the check sum of a new program is normal or not.

Switching register 1508 stores the address of a selected boot ROM. Offset register 1509 stores the offset of the other boot ROM with respect to the address of the selected boot ROM which is stored in switching register 1508.

On an address map, the boot program stored in the boot ROM set in switching register 1508 is written in an area "ROM space", and the boot program stored in the other boot ROM is written in an area "ROM space+offset". It is assumed that boot ROM 1503 is set in switching register 1508, boot ROM 1504 is set in offset register 1509, and the latest boot program to be used is stored in boot ROM 1504.

When CPU 1501 is to be started, it specifies the address of boot ROM 1503 and executes the boot program stored therein. By executing the boot program, CPU 1501 compares the time stamps of ROM 1503 and ROM 1504 and calculates the check sum of a newer program. If the check sum indicates no error, then CPU 1501 changes the data in switching register 1508 and offset register 1509 in order to set the address of offset ROM 1504 in switching register 1508. When boot ROM 1503 and boot ROM 1504 are changed over, selector 1502 outputs resetting signal 1510 to CPU 1501. Therefore, since boot ROM 1503 and boot ROM 1504 are changed over only when a new boot program is properly written, the writing of a new boot program does not fail, and the startup of CPU 1501 is prevented from failing when the data is broken.

With the cellular phone unit shown in FIG. 1, CPU 1311 cannot be restarted properly if the boot program stored in ROM 1312 is broken or the rewriting of the boot program fails. If such a problem occurs, then it has been customary to remove ROM 1311, rewrite the boot program in ROM 1311 with another device, install ROM 1311 again, and restart CPU 1311. However, such a process has been tedious and time-consuming. Particularly, since the cellular phone unit is manufactured and shipped in a large quantity, the whole rewriting process is likely to be enormous. Another problem is that when the boot ROM is removed, the boot ROM itself and other nearby parts may possibly be damaged.

With the boot program rewriting devices disclosed in Japanese laid-open patent publications Nos. 8-179937 and 2000-293376, it is not necessary to remove the ROM and write the boot program stored therein even when the boot program is broken or the rewriting thereof fails.

However, since a plurality of ROMs or boot program storage areas are required for one CPU, the disclosed boot program rewriting devices are large in scale, and are not preferable for use in cellular phone units which are strongly demanded to be small in size and weight and low in cost. The problem of an increased device scale manifests itself particularly with respect to cellular phone units having two CPUs.

SUMMARY OF THE INVENTION

It is therefore an object of the present invention to provide a radio communication device such as a cellular phone unit which is capable of rewriting a boot program while preventing a CPU from failing to start, without involving an increase in the device scale and the cost.

To achieve the above object, there is provided in accordance with the present invention a radio communication device, in which a boot program can be rewritten which is executed when started, comprising a plurality of information processors which are operable independently of each other, a plurality of memories associated with the information processors, respectively, and connected to address and data lines of the information processors, for storing boot programs for the respective information processors, and a selector connected to a plurality of address and data lines, for assigning, in an address space as viewed from each of the information processors, the memory associated with another one of the information processors to an address represented by the sum of the address of the memory associated with the information processor and a predetermined offset, and outputting a resultant address produced by subtracting the offset from a specified address to the address and data lines of the other information processor when the memory associated with the other information processor is accessed.

With the above radio communication device, since the memory associated with the other information processor is assigned in the address space of the information processor, the information processor in another system can access the memory which stores the boot program.

The selector comprises an address offset subtractor for subtracting the offset from the specified address when the memory associated with the other information processor is accessed, and a switch connected to the address offset subtractor, for being turned on only when the memory associated with the other information processor is accessed.

In usual operation of the radio communication device, the switch of the selector is turned off, preventing the contents stored in the memories from being broken due to unwanted access from the information processor in another system.

The selector comprises means for outputting data written into the memory associated with the other information processor, directly to the address and data lines of the other information processor.

Inasmuch as data can be written into the memory which stores the boot program from the information processor in the other system, the boot program can be rewritten by the information processor in the other system.

The selector comprises means for outputting data read from the memory associated with the other information processor, directly to the address and data lines of the information processor which has read the data.

Inasmuch as data can be read from the memory which stores the boot program by the information processor in the other system, the boot program can be read by the information processor in the other system.

Each of the memories is accessible from at least one of the information processors.

All the memories are accessible from all the information processors.

The information processors comprise two information processors.

According to the present invention, there is also provided a method of rewriting a boot program in a radio communication device having a plurality of information processors which are operable independently of each other and a plurality of memories associated with the information processors, respectively, and connected to address and data lines of the information processors, for storing boot programs for the respective information processors, comprising the steps of providing a selector connected to a plurality of address and data lines, for assigning, in an address space as viewed from each of the information processors, the memory associated with another one of the information processors to an address represented by the sum of the address of the memory associated with the information processor and a predetermined offset, outputting an address represented by the sum of the address of the memory associated with one of the information processors and the offset, to the address and data lines of the one information processor in order for the one information processor to rewrite the boot program for another one of the information processors, and outputting a resultant address produced by subtracting the offset from the address output from the one information processor, from the selector to the address and data lines of the other information processor.

When the one information processor accesses the memory associated with the other information processor, a switch in the selector is turned on, and an offset subtractor in the selector outputs the address produced by subtracting the offset from the address output from the one information processor, to the address and data lines of the other information processor.

The selector outputs data written into the memory associated with the other information processor, directly to the address and data lines of the other information processor.

According to the present invention, there is further provided a method of rewriting a boot program in a radio communication device having a plurality of information processors which are operable independently of each other and a plurality of memories associated with the information processors, respectively, and connected to address and data lines of the information processors, for storing boot programs for the respective information processors, comprising the steps of providing a selector connected to a plurality of address and data lines, for assigning, in an address space as viewed from each of the information processors, the memory associated with another one of the information processors to an address represented by the sum of the address of the memory associated with the information processor and a predetermined offset, and outputting a resultant address produced by subtracting the offset from a specified address to the address and data lines of the other information processor when the memory associated with the other information processor is accessed from any one of the information processors, receiving, in one of the information processors, the boot program for another one of the information processors from an external device, adding, in the one information processor, the offset to the address of the boot program for the one information processor, outputting, from the one information processor, an address represented by the sum of the offset and the address, to the address and data lines of the one information processor, and outputting the boot program for the other information processor to the address and data lines of the one information processor and writing the boot program.

According to the present invention, there is also provided a program for rewriting a boot program in a radio communication device having a plurality of information processors which are operable independently of each other, a plurality of memories associated with the information processors, respectively, and connected to address and data lines of the information processors, for storing boot programs for the respective information processors, and a selector connected to a plurality of address and data lines, for assigning, in an address space as viewed from each of the information processors, the memory associated with another one of the information processors to an address represented by the sum of the address of the memory associated with the information processor and a predetermined offset, and outputting a resultant address produced by subtracting the offset from a specified address to the address and data lines of the other information processor when the memory associated with the other information processor is accessed from any one of the information processors, the program being executable by the information processors for rewriting the boot programs, and comprising the steps of receiving, in one of the information processors, the boot program for another one of the information processors from an external device, adding, in the one information processor, the offset to the address of the boot program for the one information processor, outputting, from the one information processor, an address represented by the sum of the offset and the address, to the address and data lines of the one information processor, and outputting the boot program for the other information processor to the address and data lines of the one information processor and writing the boot program.

The program is integrally incorporated in a program having a process for carrying out usual operation of the radio communication device.

Alternatively, the program is separate from a program having a process for carrying out usual operation of the radio communication device.

According to the present invention, a boot program switching device for rewriting and switching boot programs which are executed upon a startup has a plurality of information processors which are operable independently of each other, a plurality of memories associated with the information processors, respectively, and connected to address and data lines of the information processors, for storing boot programs for the respective information processors, and a selector connected to the address and data lines, for assigning, in an address space as viewed from each of the information processors, a memory not associated with any one of the information processors to an address represented by the sum of the address of a memory associated with one of the information processors and a predetermined offset, and outputting a resultant address produced by subtracting the offset from a specified address to the address and data lines connected to the memory not associated with the information processor when the memory not associated with the information processor is accessed.

With the above boot program switching device, the selector assigns the memory in the address space of the information processor not associated with the memory, and when the address area is accessed, an address produced by subtracting the offset is outputted to a given recording unit, so that the boot program stored in a memory can be rewritten from the information processor in another system.

The information processors comprise two information processors.

The selector comprises a switch which is turned on only when the memory not associated with any one of the information processors is accessed, and an address offset subtractor for subtracting the offset from a specified address when the memory not associated with any one of the information processors is accessed and outputting a resultant address to the address and data lines connected to the memory not associated with any one of the information processors.

In usual operation of the boot program switching device, the switch of the selector is turned off, preventing the contents stored in the memories from being broken due to unwanted access from the information processor in another system.

The selector outputs data to be written into the memory not associated with any one of the information processors, directly to the address and data lines connected to the memory not associated with any one of the information processors.

The selector outputs data read from the memory not associated with any one of the information processors, directly to the address and data lines connected to the memory not associated with any one of the information processors.

A device according to the present invention has a plurality of boot program switching devices.

Since the memory associated with another information processor is assigned in the address space of the information processor by the selector, the information processor in the other system can gain access to the memory storing the boot program. Even if the data is broken or fails to be rewritten and the information processor cannot be restarted, the boot program stored in the memory can be rewritten as repeatedly as desired from the other information processor.

In usual operation of the radiation communication device, the switch of the selector is turned off, preventing the contents stored in the memories from being broken due to unwanted access from the information processor in another system.

The above and other objects, features, and advantages of the present invention will become apparent from the following description with reference to the accompanying drawings which illustrate examples of the present invention.

DETAILED DESCRIPTION OF THE PREFERRED EMBODIMENTS

Figure 1:
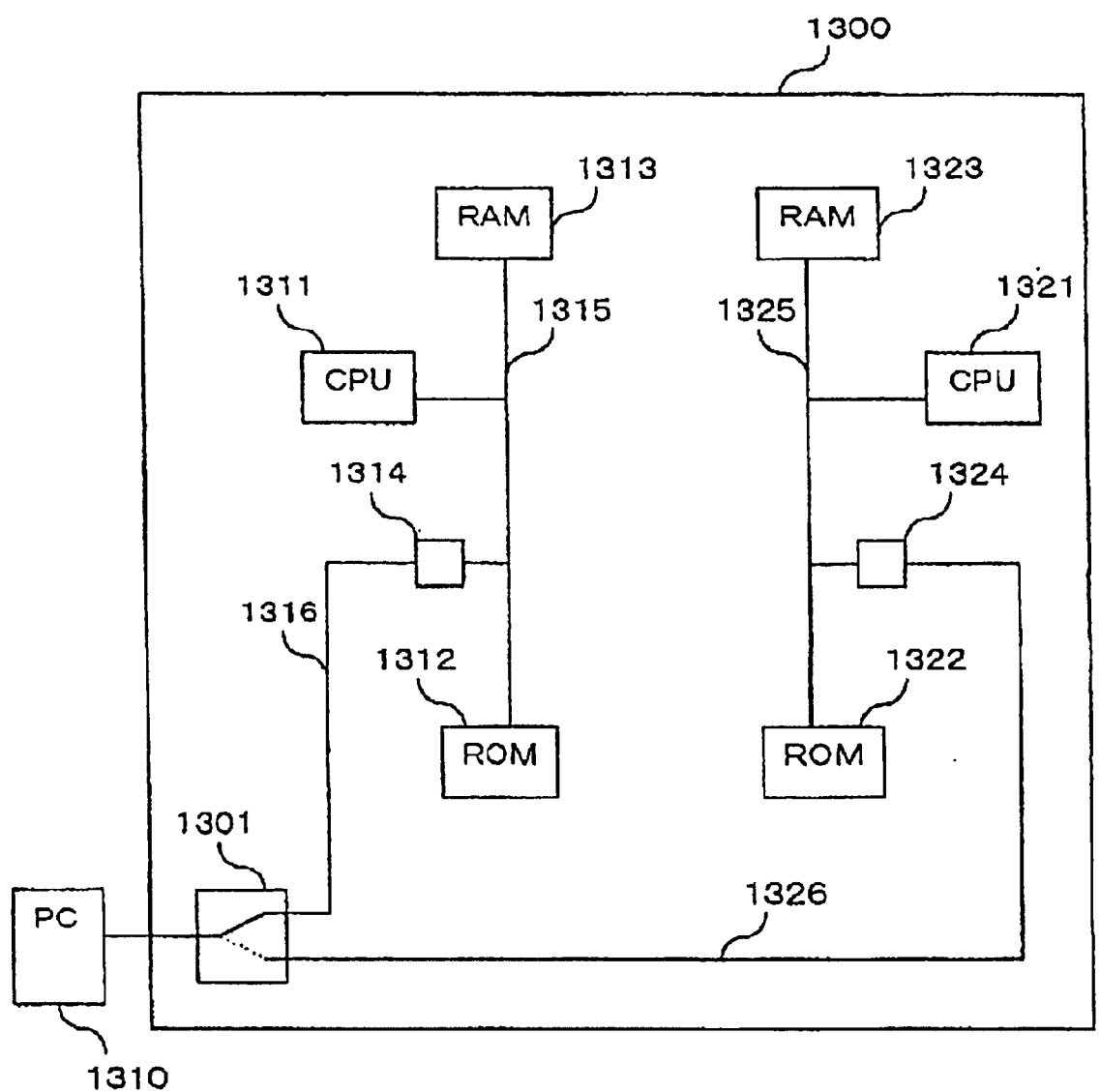
FIG. 1 is a block diagram of a device having a plurality of CPUs.
Figure 2:
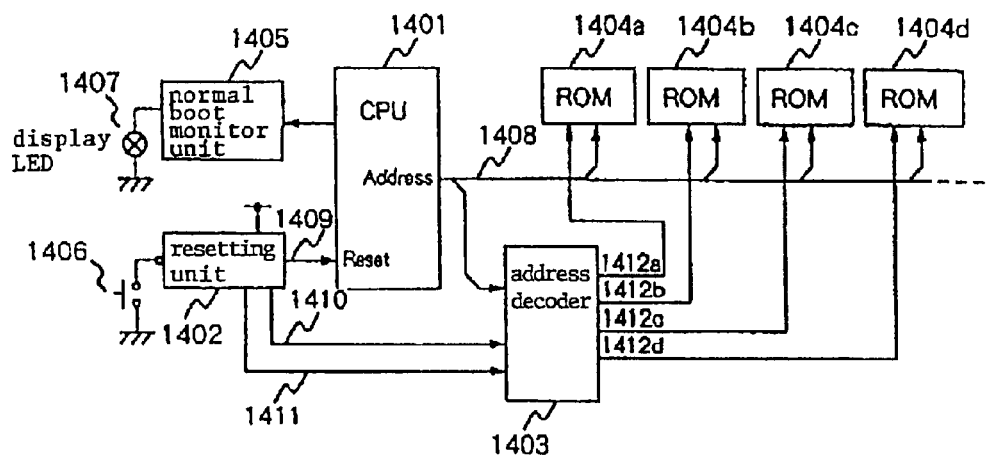
FIG. 2 is a block diagram of a conventional boot program rewriting device disclosed in Japanese laid-open patent publication No. 8-179937.
Figure 3:
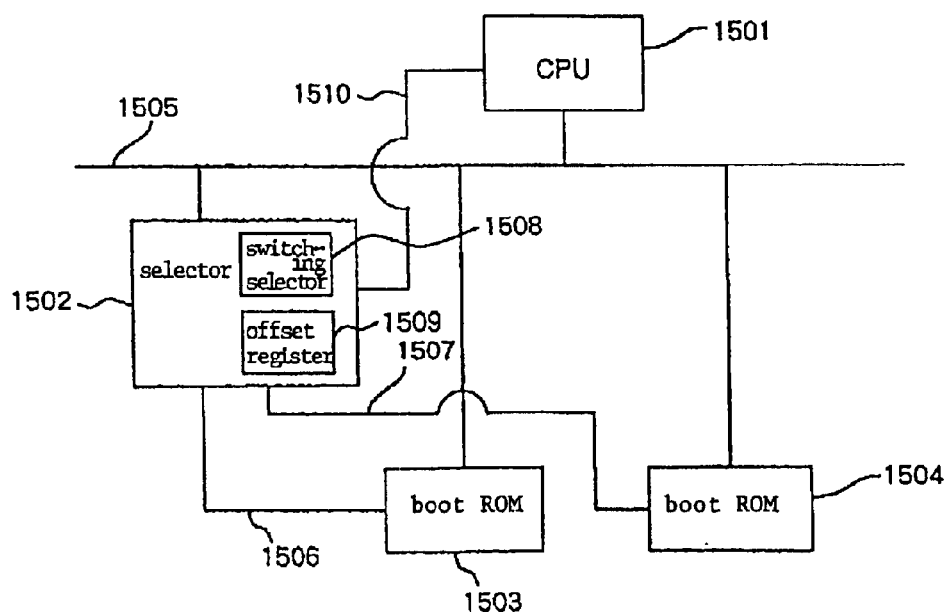
FIG. 3 is a block diagram of a conventional boot program rewriting device disclosed in Japanese laid-open patent publication No. 2000-293376.
Figure 4:
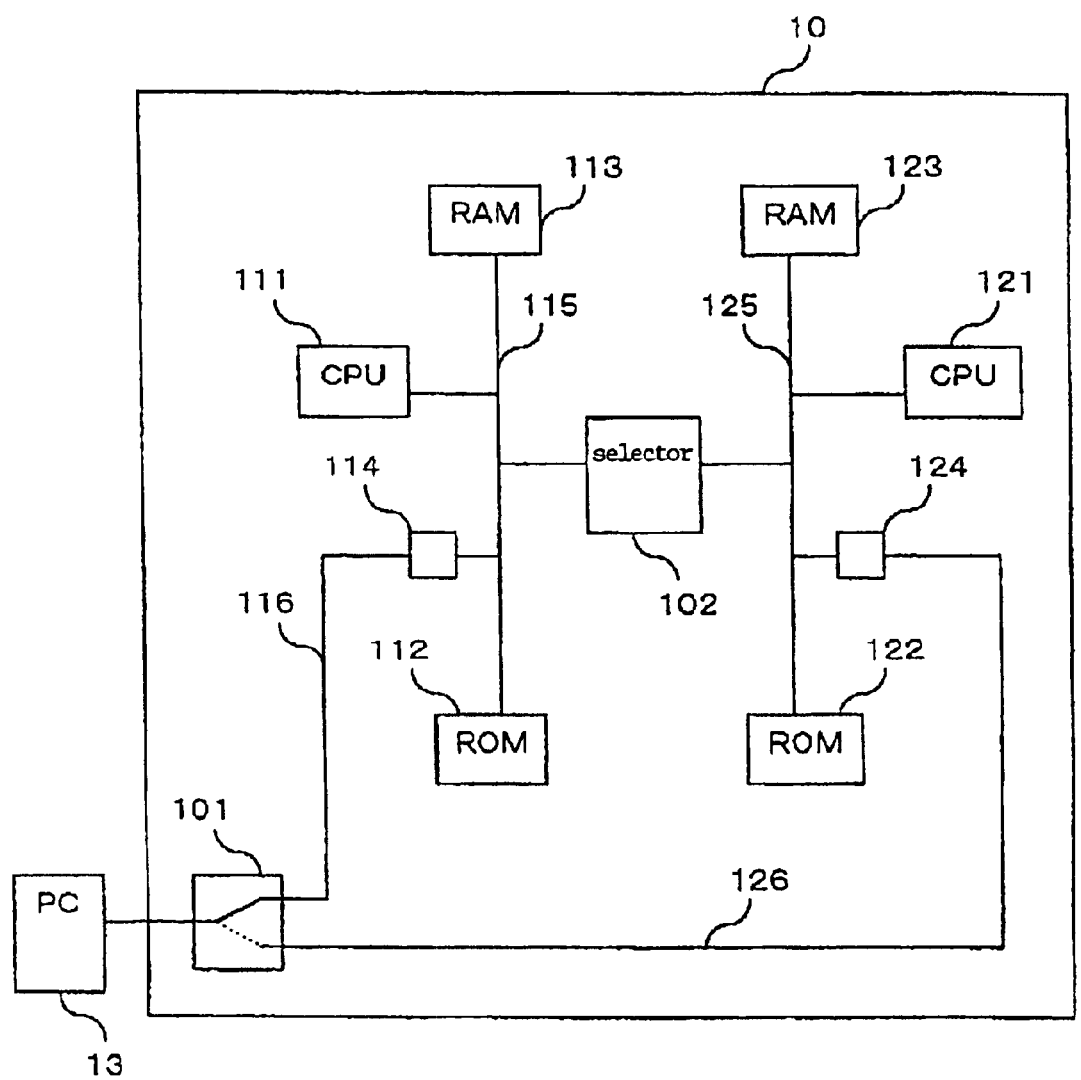
FIG. 4 is a block diagram of a cellular phone unit according to an embodiment of the present invention.

FIG. 4 shows in block form a cellular phone unit according to an embodiment of the present invention.

As shown in FIG. 4, cellular phone unit 10 has CPUs 111, 121, ROMs 112, 122, RAMs 113, 123, port interfaces 114, 124, port switch 101, and selector 102, and can be connected to personal computer (PC) 13.

CPU 111, ROM 112, RAM 113, port interface 114, and selector 102 are connected to each other by address and data lines 115 of CPU 111. CPU 121, ROM 122, RAM 123, port interface 124, and selector 102 are connected to each other by address and data lines 125 of CPU 121.

CPU 111 and CPU 121 are processors that process information independently of each other, one serving as a communication core and the other a control core.

ROM 112 comprises a ROM where recorded contents can be rewritten, such as an EEPROM or an FROM, and stores a boot program that is executed when CPU 111 is started, in a particular area. ROM 122 also comprises a ROM where recorded contents can be rewritten, and stores a boot program that is executed when CPU 121 is started, in a particular area.

RAM 113 comprises a randomly accessible volatile memory which is used when CPU 111 executes a program.

RAM 123 also comprises a randomly accessible volatile memory which is used when CPU 111 executes a program.

Port interface 114 controls port 116 in order to allow communications between CPU 111 and PC 13. Port interface 124 controls port 126 in order to allow communications between CPU 121 and PC 13.

Port switch 101 is instructed by PC 13 to select either CPU 111 or CPU 121 and allows communications between the selected CPU and PC 13.

Selector 102 interconnects address and data lines 115 and address and data lines 125, and allows CPU 111 to access ROM 122 and also allows CPU 121 to access ROM 112.

Figure 5:
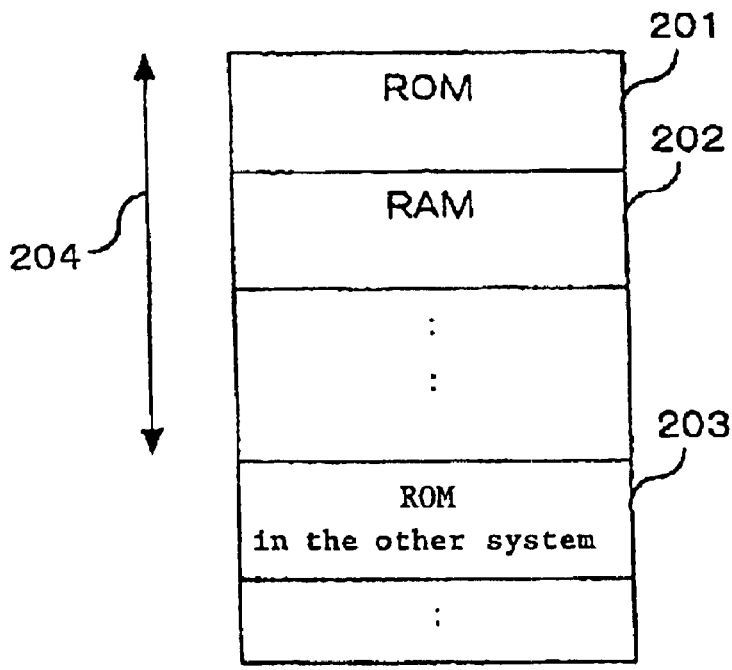
FIG. 5 is a diagram showing an address space as viewed from a CPU in the cellular phone unit shown in FIG. 4.

FIG. 5 shows an address space as viewed from CPU 111. The address space as viewed from CPU 111 includes address area 201 of ROM 112, address area 202 of RAM 113, and address area 203 of ROM 122 which is the ROM in the other system. Address area 203 is an address area which is the sum of address area 201 and given offset 204. Actually, selector 102 is present in address area 203 which is viewed from CPU 111 and CPU 121.

An address space as viewed from CPU 121 is the same as the address space shown in FIG. 5, and includes address area 201 of ROM 122, address area 202 of RAM 123, and address area 203 of ROM 112 which is the ROM in the other system.

Figure 6:
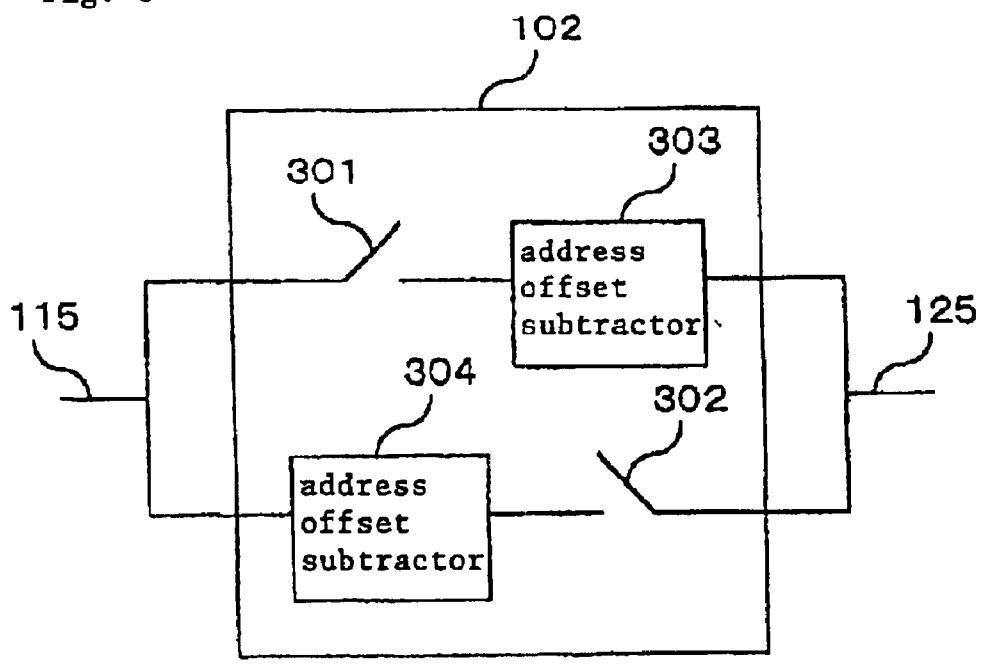
FIG. 6 is a block diagram of a selector in the cellular phone unit shown in FIG. 4.

FIG. 6 shows selector 102 in block form. Selector 102 has switches 301, 302 and address offset subtractors 303, 304.

Switch 301 is turned on when CPU 111 accesses ROM 122 through address and data lines 115.

Switch 302 is turned on when CPU 121 accesses ROM 112 through address and data lines 125.

Address offset subtractor 303 subtracts offset 204 from an address specified by CPU 111 on address and data lines 115 when CPU 111 accesses ROM 122. At this time, address offset subtractor 303 outputs data on address and data lines 115 as it is to address and data lines 125.

Address offset subtractor 304 subtracts offset 204 from an address specified by CPU 121 on address and data lines 125 when CPU 121 accesses ROM 112. At this time, address offset subtractor 304 outputs data on address and data lines 125 as it is to address and data lines 115.

Switch 301 and address offset subtractor 303 may be switched around in their connection, and switch 302 and address offset subtractor 304 may switched around in their connection.

For accessing ROM 122 from CPU 111, CPU 111 specifies an address of address area 203 of the ROM in the other system. When CPU 111 accesses ROM 122 through address and data lines 115, selector 102 subtracts offset 204 from the specified offset and outputs the resultant address to address and data lines 125. Since the resultant address is the address of ROM 122 on address and data lines 125, ROM 122 is accessed.

Similarly, when CPU 121 accesses ROM 112 through address and data lines 125, selector 102 subtracts offset 204 from the specified offset and outputs the resultant address to address and data lines 115. Since the resultant address is the address of ROM 112 on address and data lines 115, ROM 112 is accessed.

A process of rewriting a boot program stored in ROM 122 of cellular phone unit 10 will be described below.

The operator connects PC 13 to cellular phone unit 10, and starts a data transmission program on PC 13.

At this time, CPU 111 may be in an on-line mode in which it is running a program for usual operation or in an off-line mode in which it is running a program for communicating with PC 13 while stopping usual operation.

In order for CPU 111 to receive a boot program from PC 13 in the on-line mode, the program for usual operation needs to have a process for communicating with PC 13. In order for CPU 111 to receive a boot program from PC 13 in the off-line mode, an off-line program having a process for communicating with PC 13 needs to be stored in ROM 132 in a manner to be executable by CPU 111.

PC 13 controls port switch 101 to select port 116, and transmits the new boot program to CPU 111 through port interface 114. CPU 111 receives the new boot program and rewrites the boot program in ROM 122 through selector 102.

Figure 7:
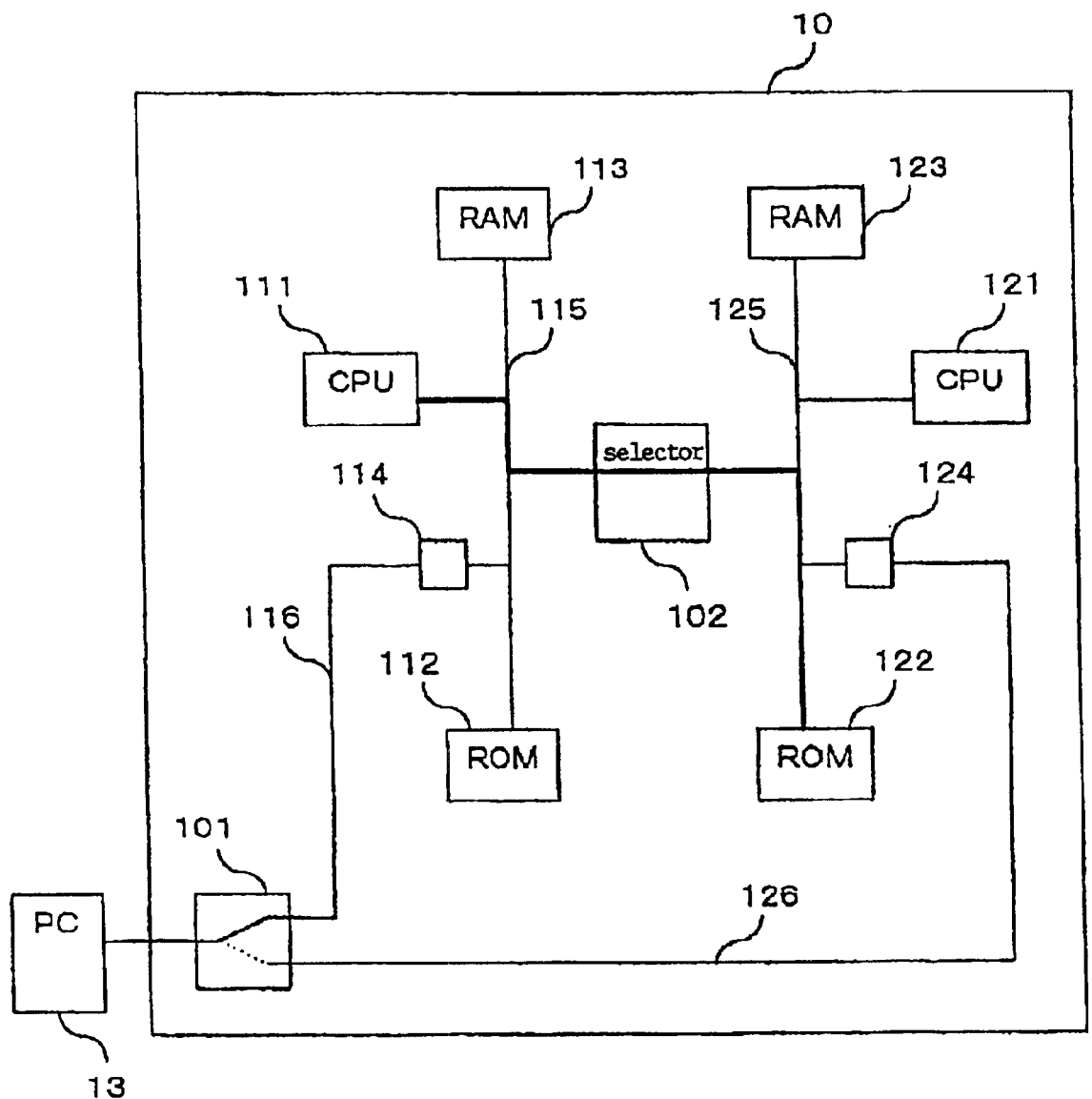
FIG. 7 is a block diagram showing a process of rewriting a ROM in the cellular phone unit shown in FIG. 4.

At this time, CPU 111 turns on switch 301 of selector 102, providing a route indicated by the thick line in FIG. 7.

When the route indicated by the thick line in FIG. 7 is formed, CPU 111 specifies an address of address area 203 of the ROM in the other system and accesses ROM 122 for data writing.

When CPU 111 accesses ROM 122, address offset subtractor 303 subtracts offset 204 from the address specified by CPU 111, and outputs the resultant address to address and data lines 125. At this time, data from CPU 111 is output as it is to address and data lines 125.

In one example, a chip select signal on address and data lines 125 with respect to ROM 122 is generated by CPU 111 and output to address and data lines 125 by selector 102. In another example, a chip select signal on address and data lines 125 with respect to ROM 122 is generated by selector 102 which decodes high-order bits of an address specified on address and data lines 115 by CPU 111, and output to address and data lines 125.

Figure 8:
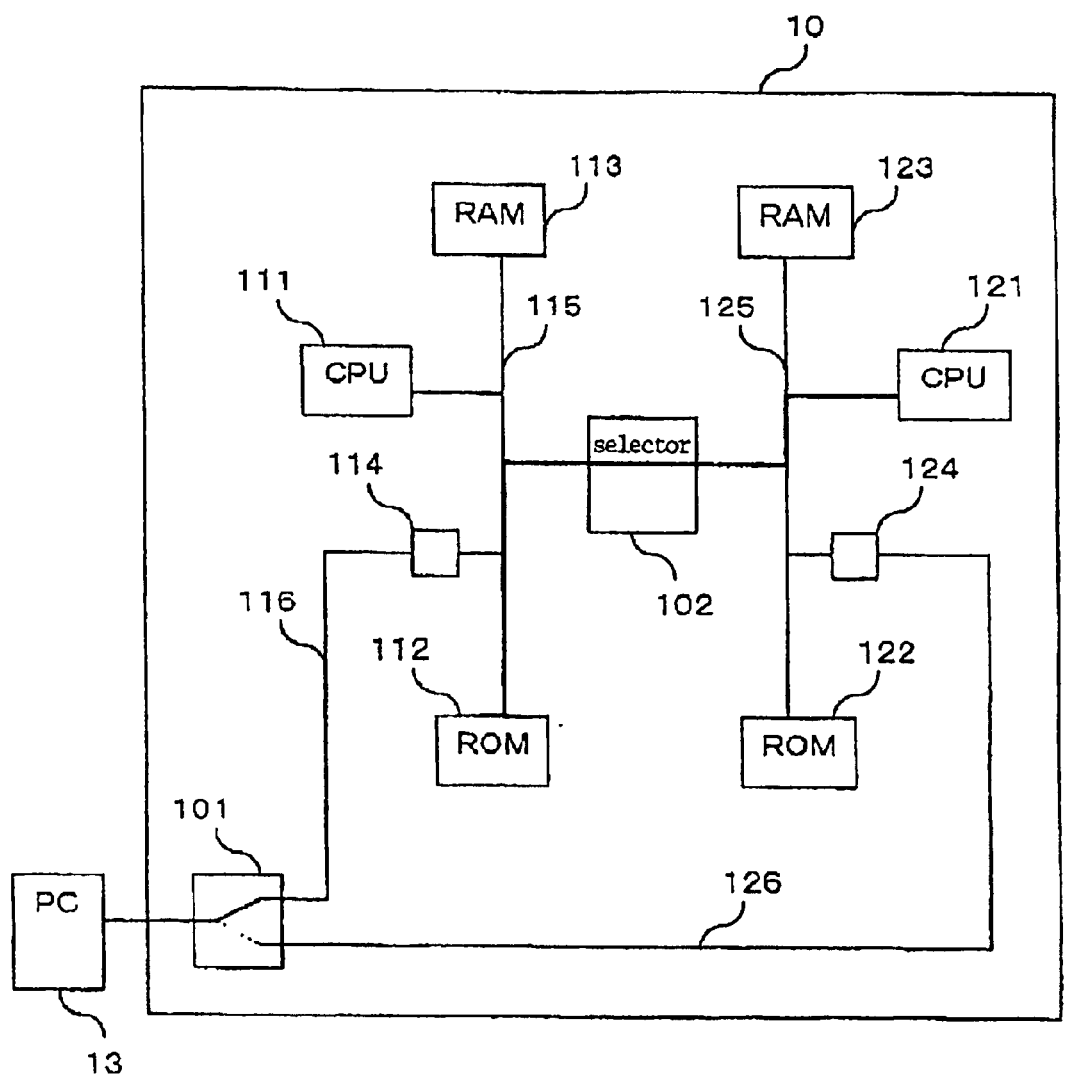
FIG. 8 is a block diagram showing another process of rewriting a ROM in the cellular phone unit shown in FIG. 4.

Since the boot program stored in ROM 122 can be rewrittten by CPU 111, the boot program for CPU 121 can be rewritten irrespectively of the contents stored in ROM 122 and the operating state of CPU 121. Similarly, since the boot program stored in ROM 112 can be rewritten by CPU 121, the boot program for CPU 111 can be rewritten irrespectively of the contents stored in ROM 112 and the operating state of CPU 111. At this time, CPU 121 turns on switch 302, providing a route indicated by the thick line in FIG. 8. Usually, as shown in FIG. 6, switches 301, 302 of selector 102 are turned off.

After the boot program is thus rewritten, the operator resets the CPU or turns on the power supply again to enable the CPU to execute the new boot program.

Operation of the cellular phone unit at the time of starting the CPU will be described below. The startup of the CPU 121 will be described by way of example.

When CPU 121 is reset, CPU 121 accesses address area 201 of ROM 122, and executes the program stored therein.

If the boot program stored in ROM 122 suffers some trouble and CPU 121 is not started properly, then CPU 11 accesses ROM 122, rewrites the boot program, and restarts CPU 121. CPU 121 can eventually be started normally.

Ports 116, 126 comprise USB, RS232c, or similar connections, for example. The present embodiment is applicable to the downloading of a program or parameter from a radio base station to a cellular phone unit via an air interface.

With the cellular phone unit according to the above embodiment, a ROM is assigned to an address area of a CPU of another system by a selector, and when its address space is accessed, an address produced by subtracting a given offset is output to the ROM. Therefore, the boot program stored in the ROM can be rewritten from the CPU in the other system. Even if the data is broken or fails to be rewritten and the CPU of the present system cannot be restarted, the boot program stored in the ROM can be rewritten as repeatedly as desired from the CPU in the other system.

Figure 9:
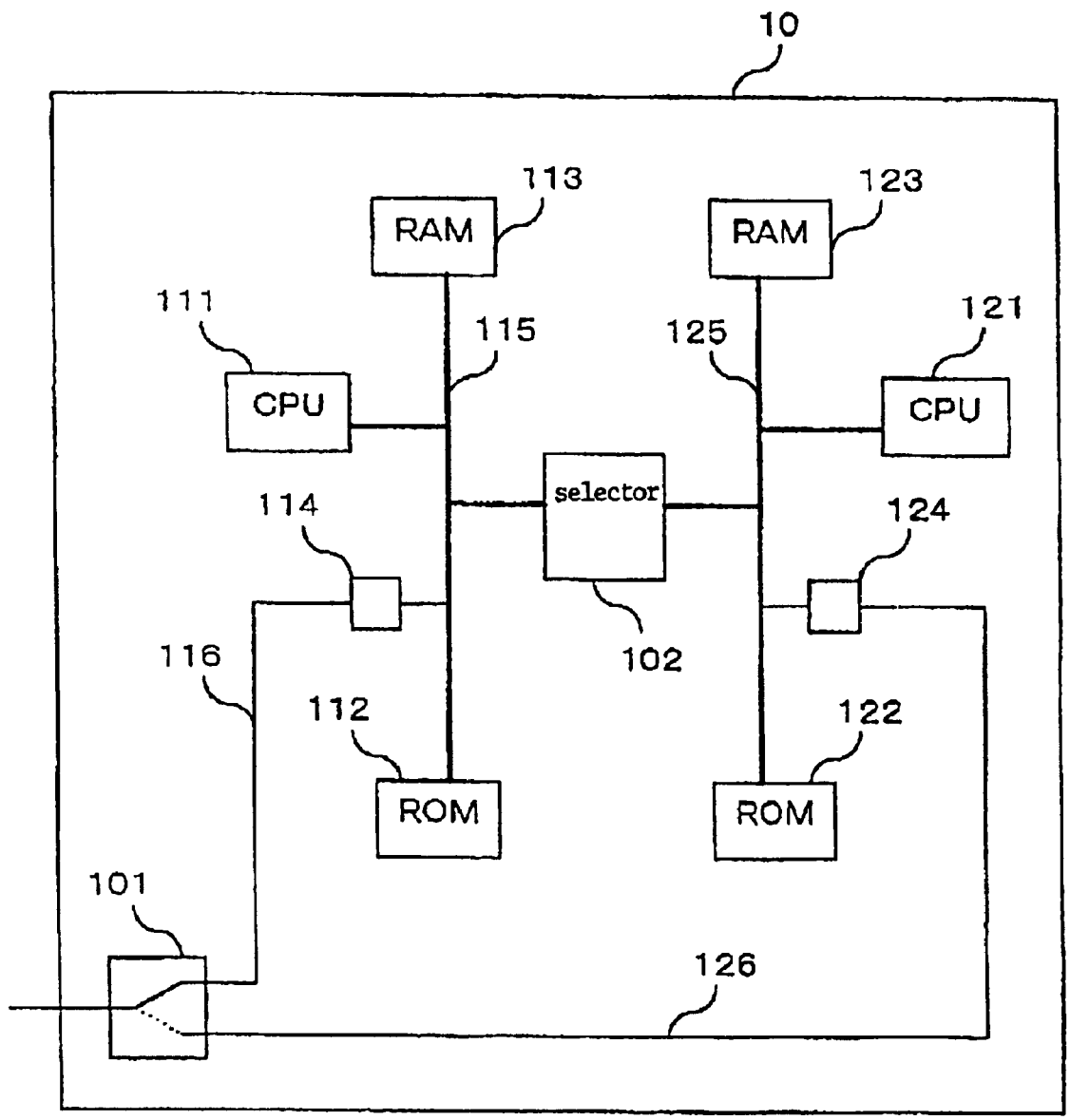
FIG. 9 is a block diagram showing a route of address and data lines in a normal mode in the cellular phone unit shown in FIG. 4.

Usually, switches 301, 302 of selector 102 are turned off. Therefore, as shown in FIG. 9, CPUs 111, 121 are operating independently of each other. Therefore, the data stored in ROMs 112, 122 are prevented from being broken by unwanted access from the CPU in the other system.

While the process of writing a ROM to rewrite the boot program stored therein has been described above, the principles of the invention are also applicable to a process of reading data from a ROM to confirm written contents thereof.

Figure 10:
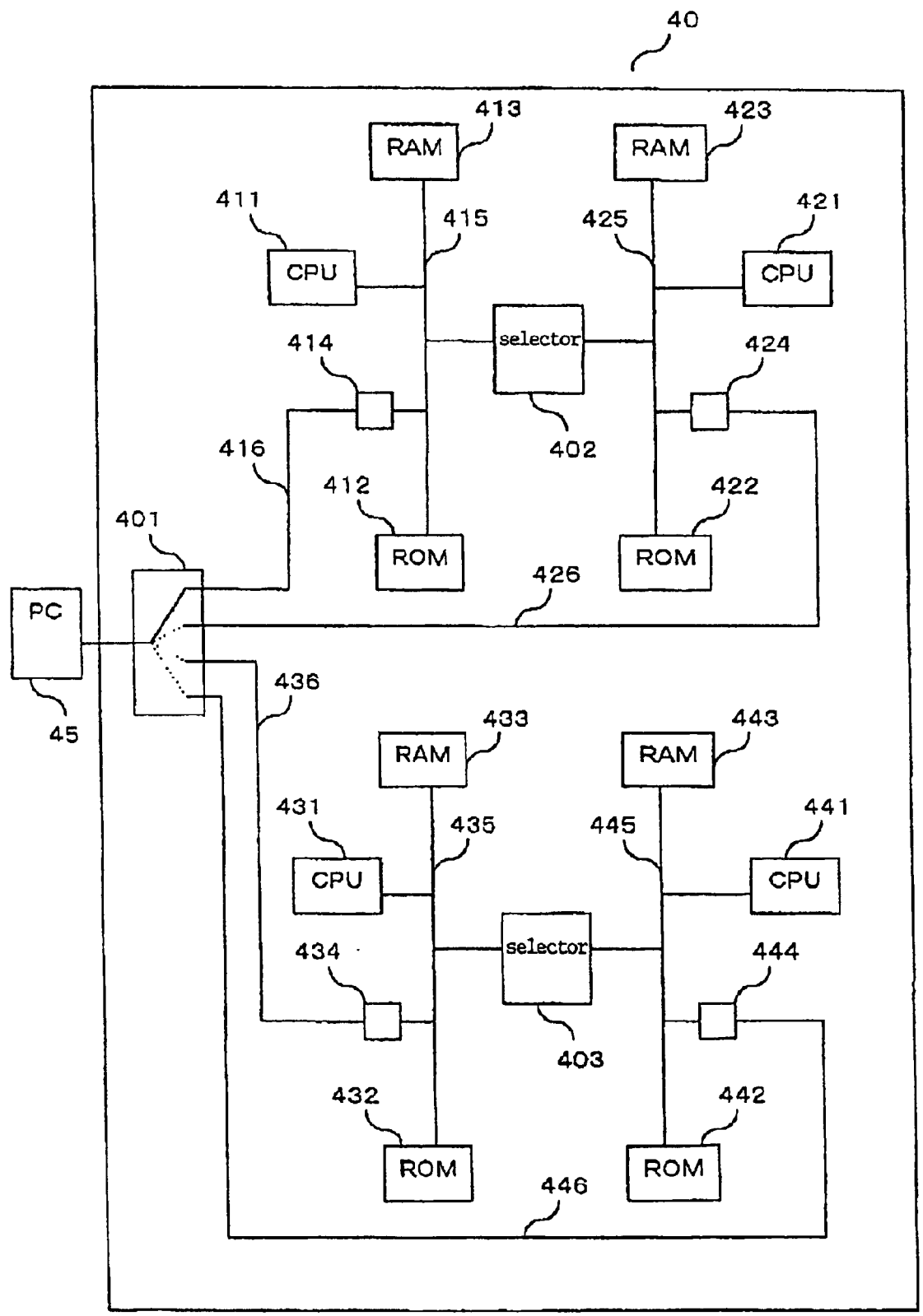
FIG. 10 is a block diagram of a cellular phone unit according to another embodiment of the present invention.

FIG. 10 shows in block form a cellular phone unit according to another embodiment of the present invention. Cellular phone unit 40 shown in FIG. 10 has a plurality of CPUs grouped into pairs, and CPUs in each pair can gain access to each other's ROMs.

As shown in FIG. 10, cellular phone unit 40 has CPUs 411, 421, 431, 441, ROMs 412, 422, 432, 442, RAMs 413, 423, 433, 443, port interfaces 414, 424, 434, 444, port switch 401, and selectors 402, 403.

CPU 411, ROM 412, RAM 413, port interface 414, and selector 402 are connected to each other by address and data lines 415 of CPU 411. CPU 421, ROM 422, RAM 423, port interface 424, and selector 402 are connected to each other by address and data lines 425 of CPU 421.

CPU 431, ROM 432, RAM 433, port interface 434, and selector 403 are connected to each other by address and data lines 435 of CPU 431. CPU 441, ROM 442, RAM 443, port interface 444, and selector 403 are connected to each other by address and data lines 445 of CPU 441.

CPUs 411, 421, 431, 441 are processors that operate independently of each other.

The boot program for CPU 411 is stored in ROM 412. The boot program for CPU 421 is stored in ROM 422. The boot program for CPU 431 is stored in ROM 432. The boot program for CPU 441 is stored in ROM 442.

Selector 402 interconnects address and data lines 415 and address and data lines 425, and allows CPU 411 to access ROM 422 and also allows CPU 421 to access ROM 412. Selector 403 inter connects address and data lines 435 and address and data lines 445, and allows CPU 431 to access ROM 442 and also allows CPU 441 to access ROM 432.

Figure 11:
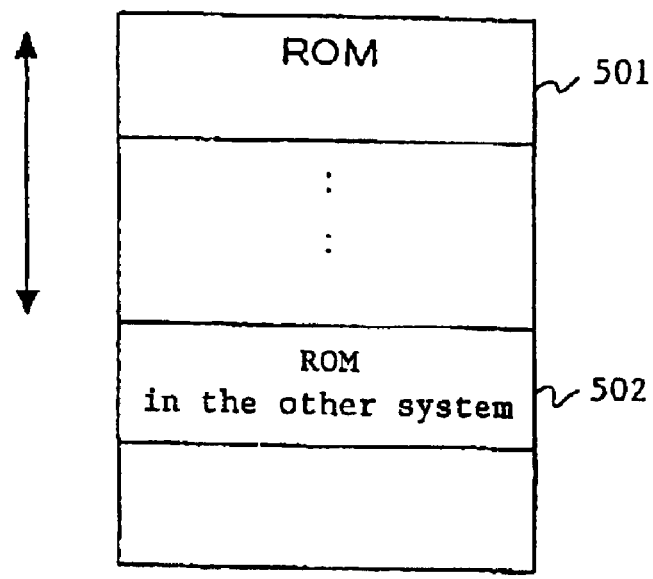
FIG. 11 is a diagram showing an address space as viewed from a CPU in the cellular phone unit shown in FIG. 10.

FIG. 11 shows an address space as viewed from CPU 411. The address space as viewed from CPU 411 includes address area 501 of ROM 412 and address area 502 of ROM 422 which is the ROM in the other system. Address area 502 is an address area which is the sum of address area 501 and given offset 503.

Address spaces as viewed from CPUs 421, 431, 441 are the same as the address space shown in FIG. 11.

Figure 12:
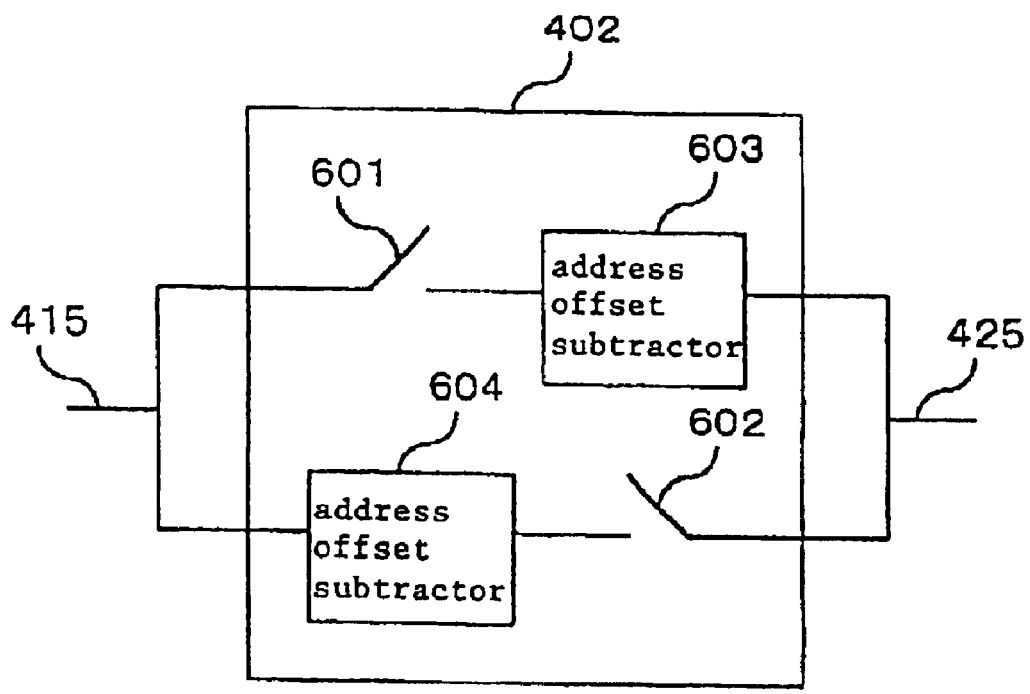
FIG. 12 is a block diagram of a selector in the cellular phone unit shown in FIG. 10.

FIG. 12 shows selector 402 in block form. Selector 402 has switches 601, 602 and address offset subtractors 603, 604.

Switch 601 is turned on when CPU 411 accesses ROM 422 through address and data lines 415.

Switch 602 is turned on when CPU 421 accesses ROM 412 through address and data lines 425.

Address offset subtractor 603 subtracts offset 503 from an address specified by CPU 411 on address and data lines 415 when CPU 411 accesses ROM 422. At this time, address offset subtractor 603 outputs data on address and data lines 415 as it is to address and data lines 425.

Address offset subtractor 604 subtracts offset 503 from an address specified by CPU 421 on address and data lines 425 when CPU 421 accesses ROM 412. At this time, address offset subtractor 604 outputs data on address and data lines 425 as it is to address and data lines 415.

Actually, selector 402 is present in address area 502 which is viewed from CPU 411 and CPU 421.

For accessing ROM 422 from CPU 411, CPU 411 specifies an address of address area 502 of the ROM in the other system. When CPU 411 accesses ROM 422 through address and data lines 415, selector 402 subtracts offset 503 from the specified offset and outputs the resultant address to address and data lines 425. Since the resultant address is the address of ROM 422 on address and data lines 425, ROM 422 is accessed.

Similarly, when CPU 421 accesses ROM 412 through address and data lines 425, selector 402 subtracts offset 503 from the specified offset and outputs the resultant address to address and data lines 415. Since the resultant address is the address of ROM 412 on address and data lines 415, ROM 412 is accessed.

Selector 403 is identical in structure to selector 402.

Figure 13:
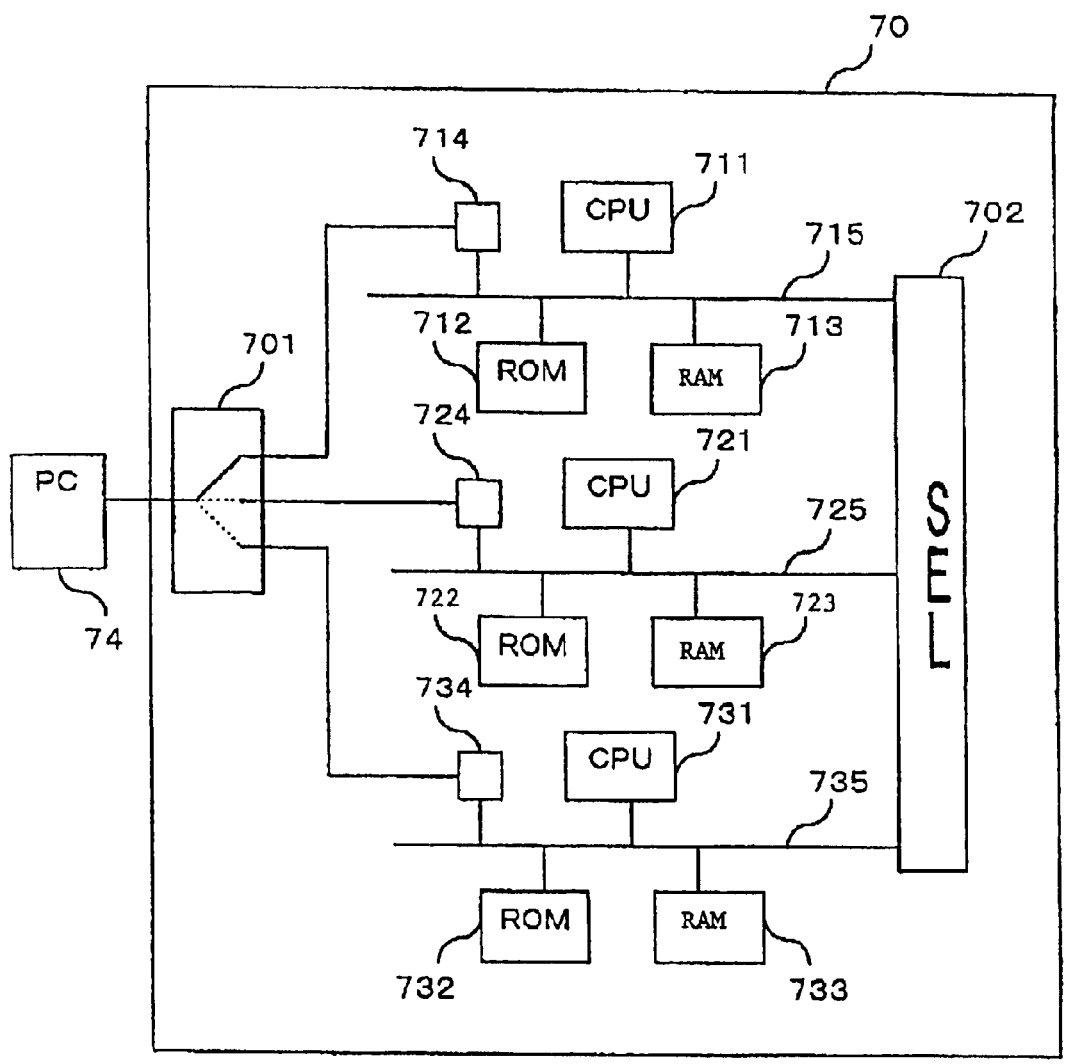
FIG. 13 is a block diagram of a cellular phone unit according to still another embodiment of the present invention.

FIG. 13 shows in block form a cellular phone unit according to still another embodiment of the present invention. Cellular phone unit 70 shown in FIG. 13 has a plurality of CPUs, and ROMS in their systems can be accessed by CPUs in the other systems.

As shown in FIG. 13, cellular phone unit 70 has CPUs 711, 721, 731, ROMs 712, 722, 732, RAMs 713, 723, 733, port interfaces 714, 724, 734, port switch 701, and selector 702, and can be connected to personal computer (PC) 74.

CPU 711, ROM 712, RAM 713, port interface 714, and selector 702 are connected to each other by address and data lines 715 of CPU 711. CPU 721, ROM 722, RAM 723, port interface 724, and selector 702 are connected to each other by address and data lines 725 of CPU 721. CPU 731, ROM 732, RAM 733, port interface 734, and selector 702 are connected to each other by address and data lines 735 of CPU 731.

CPU 711, 721, 731 are processors that operate independently of each other.

The boot program for CPU 711 is stored in ROM 712. The boot program for CPU 721 is stored in ROM 722. The boot program for CPU 731 is stored in ROM 732.

Selector 702 interconnect address and data lines 715, 725, 735.

Figure 14:
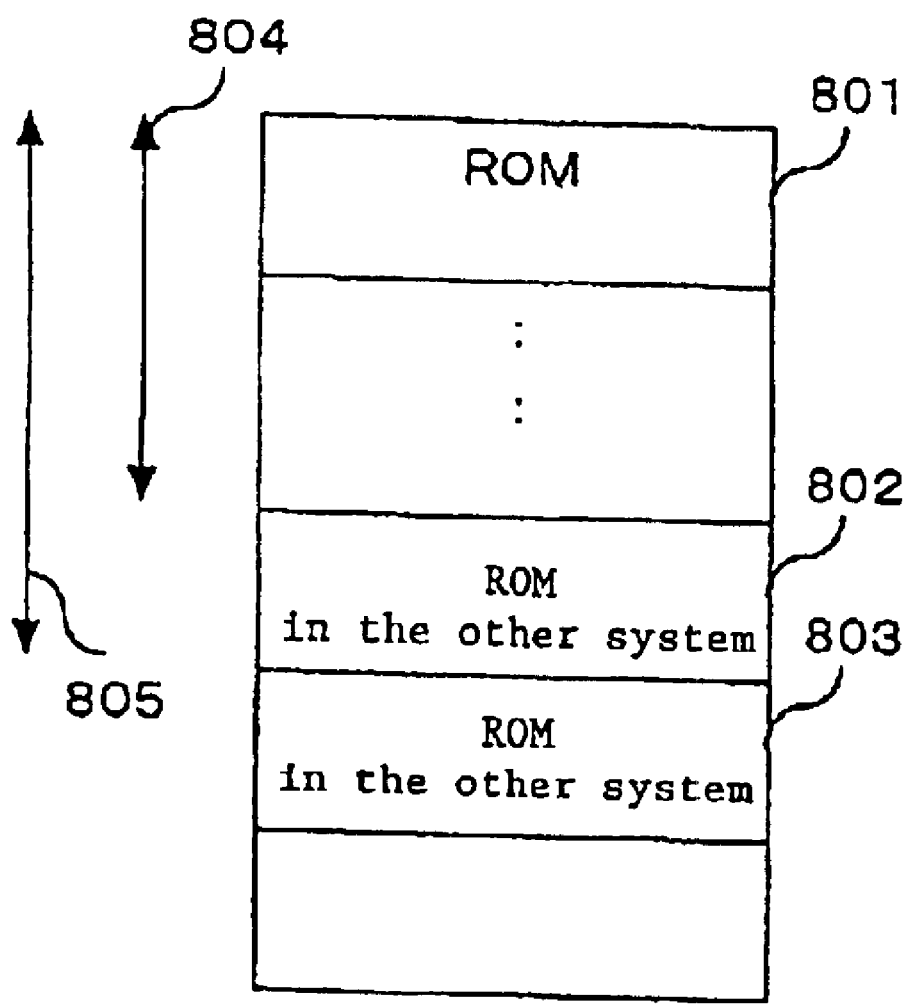
FIG. 14 is a diagram showing an address space as viewed from a CPU in the cellular phone unit shown in FIG. 13.

FIG. 14 shows an address space as viewed from CPU 711. The address space as viewed from CPU 711 includes address area 801 of ROM 712 and address areas 802, 803 of ROMs 722, 732 which are the ROMs in the other systems. Address area 802 is an address area which is the sum of address area 801 and given offset 804. Address area 803 is an address area which is the sum of address area 801 and given offset 805.

Address spaces as viewed from CPUs 721, 731 are the same as the address space shown in FIG. 14.

Figure 15:
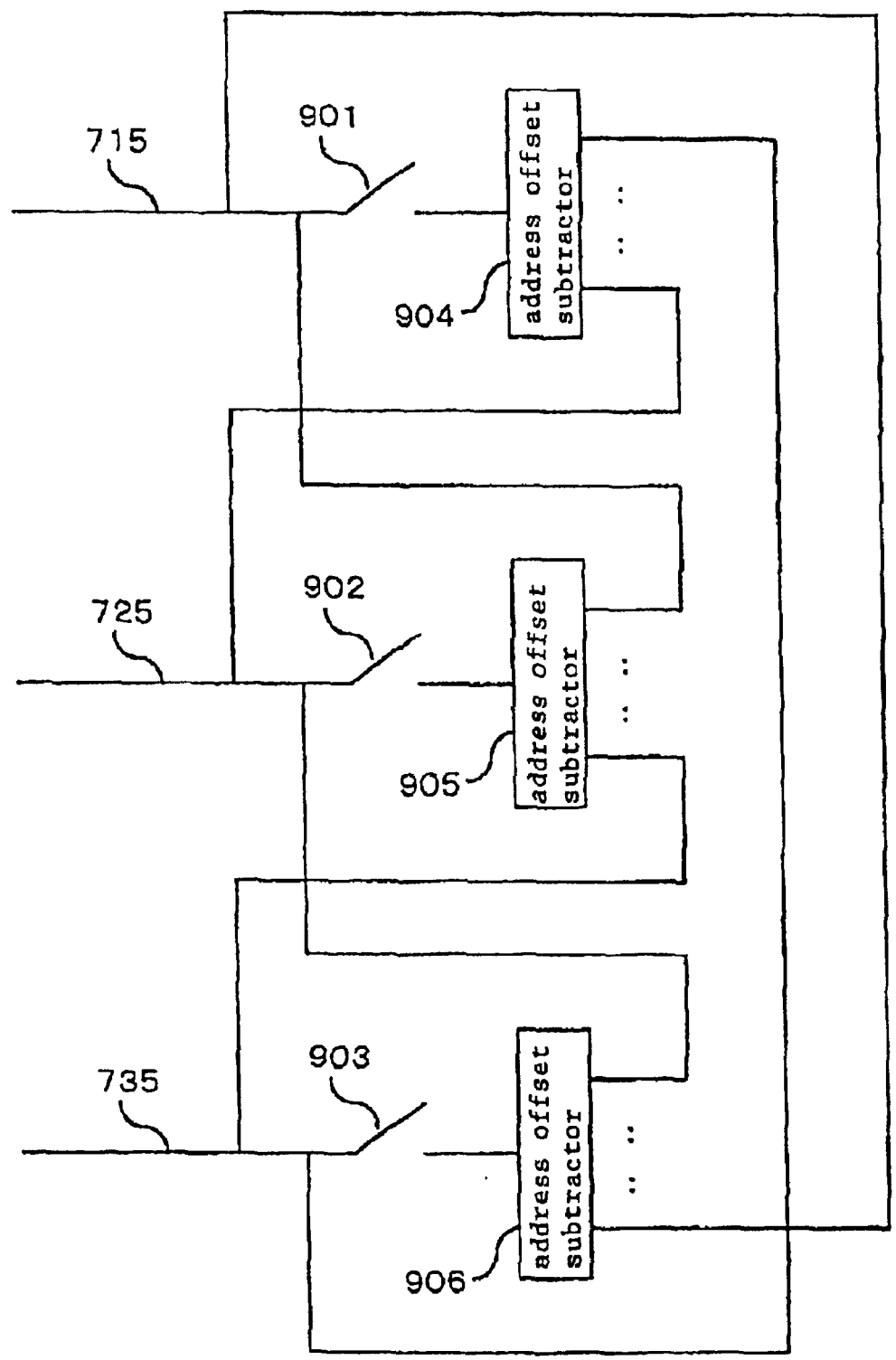
FIG. 15 is a block diagram of a selector in the cellular phone unit shown in FIG. 13.

FIG. 15 shows selector 702 in block form. Selector 702 has switches 901, 902, 903 and address offset subtractors 904, 905, 906.

Switch 901 is turned on when CPU 711 accesses ROMs 723, 732 through address and data lines 715. Switch 902 is turned on when CPU 721 accesses ROMs 712, 732 through address and data lines 725. Switch 903 is turned on when CPU 731 accesses ROMs 712, 723 through address and data lines 735.

Address offset subtractor 904 subtracts offset 804 from an address specified by CPU 711 on address and data lines 715 when CPU 711 accesses ROM 722. At this time, address offset subtractor 904 outputs data on address and data lines 715 as it is to address and data lines 725. Address offset subtractor 904 subtracts offset 805 from an address specified by CPU 711 on address and data lines 715 when CPU 711 accesses ROM 732. At this time, address offset subtractor 904 outputs data on address and data lines 715 as it is to address and data lines 735.

Address offset subtractor 905 subtracts offset 804 from an address specified by CPU 721 on address and data lines 725 when CPU 721 accesses ROM 732. At this time, address offset subtractor 905 outputs data on address and data lines 725 as it is to address and data lines 735. Address offset subtractor 905 subtracts offset 805 from an address specified by CPU 721 on address and data lines 725 when CPU 721 accesses ROM 712. At this time, address offset subtractor 905 outputs data on address and data lines 725 as it is to address and data lines 715.

Address offset subtractor 906 subtracts offset 804 from an address specified by CPU 731 on address and data lines 735 when CPU 731 accesses ROM 712. At this time, address offset subtractor 906 outputs data on address and data lines 735 as it is to address and data lines 715. Address offset subtractor 906 subtracts offset 805 from an address specified by CPU 731 on address and data lines 735 when CPU 731 accesses ROM 722. At this time, address offset subtractor 906 outputs data on address and data lines 735 as it is to address and data lines 725.

Actually, selector 702 is present in address areas 802, 803 which are viewed from CPUs 711, 721, 731.

For accessing ROM 722 from CPU 711, CPU 711 specifies an address of address area 802. When CPU 711 accesses ROM 722 through address and data lines 715, selector 702 subtracts offset 804 from the specified offset and outputs the resultant address to address and data lines 725. Since the resultant address is the address of ROM 722 on address and data lines 725, ROM 722 is accessed. For accessing ROM 732 from CPU 711, CPU 711 specifies an address of address area 803. When CPU 711 accesses ROM 732 through address and data lines 715, selector 702 subtracts offset 804 from the specified offset and outputs the resultant address to address and data lines 735. Since the resultant address is the address of ROM 732 on address and data lines 725, ROM 732 is accessed.

For accessing ROM 732 from CPU 721, CPU 721 specifies an address of address area 802. When CPU 721 accesses ROM 732 through address and data lines 725, selector 702 subtracts offset 804 from the specified offset and outputs the resultant address to address and data lines 735. Since the resultant address is the address of ROM 732 on address and data lines 735, ROM 732 is accessed. For accessing ROM 712 from CPU 721, CPU 721 specifies an address of address area 803. When CPU 721 accesses ROM 712 through address and data lines 725, selector 702 subtracts offset 805 from the specified offset and outputs the resultant address to address and data lines 715. Since the resultant address is the address of ROM 712 on address and data lines 715, ROM 712 is accessed.

For accessing ROM 712 from CPU 731, CPU 731 specifies an address of address area 802. When CPU 731 accesses ROM 712 through address and data lines 735, selector 702 subtracts offset 804 from the specified offset and outputs the resultant address to address and data lines 715. Since the resultant address is the address of ROM 712 on address and data lines 715, ROM 712 is accessed. For accessing ROM 722 from CPU 731, CPU 731 specifies an address of address area 803. When CPU 731 accesses ROM 722 through address and data lines 735, selector 702 subtracts offset 805 from the specified offset and outputs the resultant address to address and data lines 725. Since the resultant address is the address of ROM 722 on address and data lines 725, ROM 722 is accessed.

With the cellular phone unit 70 shown in FIG. 13, CPU 711 can gain access to both ROM 722 and ROM 732, CPU 721 can gain access to both ROM 732 and ROM 712, and CPU 731 can gain access to both ROM 712 and ROM 722. However, the ROM in another system that is accessible by CPU 711 may be ROM 722 only, the ROM in another system that is accessible by CPU 721 may be ROM 732 only, and the ROM in another system that is accessible by CPU 731 may be ROM 712 only.

While preferred embodiments of the present invention have been described using specific terms, such description is for illustrative purposes only, and it is to be understood that changes and variations may be made without departing from the spirit or scope of the following claims.

What is claimed is:

1. A radio communication device, in which a boot program can be rewritten which is executed when started, comprising:
    a plurality of information processors which are operable independently of each other;
    a plurality of memories associated with said information processors, respectively, and connected to address and data lines of said information processors, for storing boot programs for the respective information processors; and
    a selector connected to a plurality of address and data lines, for assigning, in an address space as viewed from each of the information processors, the memory associated with another one of the information processors to an address represented by a sum of the address of the memory associated with the information processor and a predetermined offset, and outputting a resultant address produced by subtracting said offset from a specified address to the address and data lines of the other information processor when the memory associated with the other information processor is accessed.

2. A radio communication device according to claim 1, wherein said selector comprises:
    an address offset subtractor for subtracting said offset from the specified address when the memory associated with the other information processor is accessed; and
    a switch connected to said address offset subtractor, for being turned on only when the memory associated with the other information processor is accessed.

3. A radio communication device according to claim 1, wherein said selector comprises means for outputting data written into the memory associated with the other information processor, directly to said address and data lines of the other information processor.

4. A radio communication device according to claim 2, wherein said selector comprises means for outputting data written into the memory associated with the other information processor, directly to said address and data lines of the other information processor.

5. A radio communication device according to claim 1, wherein said selector comprises means for outputting data read from the memory associated with the other information processor, directly to said address and data lines of the information processor which has read the data.

6. A radio communication device according to claim 2, wherein said selector comprises means for outputting data read from the memory associated with the other information processor, directly to said address and data lines of the information processor which has read the data.

7. A radio communication device according to claim 3, wherein said selector comprises means for outputting data read from the memory associated with the other information processor, directly to said address and data lines of the information processor which has read the data.

8. A radio communication device according to claim 1, wherein each of said memories is accessible from at least one of said information processors.

9. A radio communication device according to claim 2, wherein each of said memories is accessible from at least one of said information processors.

10. A radio communication device according to claim 3, wherein each of said memories is accessible from at least one of said information processors.

11. A radio communication device according to claim 5, wherein each of said memories is accessible from at least one of said information processors.

12. A radio communication device according to claim 1, wherein all said memories are accessible from all said information processors.

13. A radio communication device according to claim 2, wherein all said memories are accessible from all said information processors.

14. A radio communication device according to claim 3, wherein all said memories are accessible from all said information processors.

15. A radio communication device according to claim 5, wherein all said memories are accessible from all said information processors.

16. A radio communication device according to claim 8, wherein all said memories are accessible from all said information processors.

17. A radio communication device according to claim 1, wherein said information processors comprise two information processors.

18. A radio communication device according to claim 2, wherein said information processors comprise two information processors.

19. A radio communication device according to claim 3, wherein said information processors comprise two information processors.

20. A radio communication device according to claim 5, wherein said information processors comprise two information processors.

21. A radio communication device according to claim 8, wherein said information processors comprise two information processors.

22. A radio communication device according to claim 12, wherein said information processors comprise two information processors.

23. A method of rewriting a boot program in a radio communication device having a plurality of information processors which are operable independently of each other and a plurality of memories associated with said information processors, respectively, and connected to address and data lines of said information processors, for storing boot programs for the respective information processors, comprising the steps of:

providing a selector connected to a plurality of address and data lines, for assigning, in an address space as viewed from each of the information processors, the memory associated with another one of the information processors to an address represented by a sum of the address of the memory associated with the information processor and a predetermined offset;

outputting an address represented by the sum of the address of the memory associated with one of the information processors and said offset, to the address and data lines of said one information processor in order for said one information processor to rewrite the boot program for another one of the information processors; and outputting a resultant address produced by subtracting said offset from said address output from said one information processor, from said selector to the address and data lines of the other information processor.

24. A method according to claim 23, wherein when said one information processor accesses the memory associated with said other information processor, a switch in said selector is turned on, and an offset subtractor in said selector outputs the address produced by subtracting said offset from said address output from said one information processor, to the address and data lines of the other information processor.

25. A method according to claim 23, wherein said selector outputs data written into the memory associated with the other information processor, directly to said address and data lines of the other information processor.

26. A method according to claim 24, wherein said selector outputs data written into the memory associated with the other information processor, directly to said address and data lines of the other information processor.

27. A method of rewriting a boot program in a radio communication device having a plurality of information processors which are operable independently of each other and a plurality of memories associated with said information processors, respectively, and connected to address and data lines of said information processors, for storing boot programs for the respective information processors, comprising the steps of:

providing a selector connected to a plurality of address and data lines, for assigning, in an address space as viewed from each of the information processors, the memory associated with another one of the information processors to an address represented by a sum of the address of the memory associated with the information processor and a predetermined offset, and outputting a resultant address produced by subtracting said offset from a specified address to the address and data lines of the other information processor when the memory associated with the other information processor is accessed from any one of the information processors;

receiving, in one of the information processors, the boot program for another one of the information processors from an external device;

adding, in said one information processor, said offset to the address of the boot program for said one information processor;

outputting, from said one information processor, an address represented by the sum of said offset and said address, to the address and data lines of said one information processor; and outputting the boot program for the other information processor to the address and data lines of said one information processor and writing the boot program.

28. A program for rewriting a boot program in a radio communication device having a plurality of information processors which are operable independently of each other, a plurality of memories associated with said information processors, respectively, and connected to address and data lines of said information processors, for storing boot programs for the respective information processors, and a selector connected to a plurality of address and data lines, for assigning, in an address space as viewed from each of the information processors, the memory associated with another one of the information processors to an address represented by a sum of the address of the memory associated with the information processor and a predetermined offset, and outputting a resultant address produced by subtracting said offset from a specified address to the address and data lines of the other information processor when the memory associated with the other information processor is accessed from any one of the information processors, said program being executable by said information processors for rewriting the boot programs, and comprising the steps of:

receiving, in one of the information processors, the boot program for another one of the information processors from an external device;

adding, in said one information processor, said offset to the address of the boot program for said one information processor;

outputting, from said one information processor, an address represented by the sum of said offset and said address, to the address and data lines of said one information processor; and outputting the boot program for the other information processor to the address and data lines of said one information processor and writing the boot program.

29. A program according to claim 28, which is integrally incorporated in a program having a process for carrying out usual operation of the radio communication device.

30. A program according to claim 28, which is separate from a program having a process for carrying out usual operation of the radio communication device.

\* \* \* \* \*